US009642436B2

(12) United States Patent
Miyamoto

(10) Patent No.: US 9,642,436 B2
(45) Date of Patent: May 9, 2017

(54) DRAWING DEVICE AND METHOD FOR DETECTING SHAPE OF NAIL IN THE SAME

(71) Applicant: CASIO COMPUTER CO., LTD., Shibuya-ku, Tokyo (JP)

(72) Inventor: Yuichi Miyamoto, Yokohama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/074,256

(22) Filed: Mar. 18, 2016

(65) Prior Publication Data

US 2016/0270504 A1 Sep. 22, 2016

(30) Foreign Application Priority Data

Mar. 20, 2015 (JP) ................................ 2015-057073

(51) Int. Cl.
*G06K 15/22* (2006.01)
*A45D 29/00* (2006.01)
*B41J 3/407* (2006.01)

(52) U.S. Cl.
CPC .............. *A45D 29/00* (2013.01); *B41J 3/407* (2013.01); *A45D 2029/005* (2013.01)

(58) Field of Classification Search
None
See application file for complete search history.

(56) References Cited

U.S. PATENT DOCUMENTS 6,067,996 A * 5/2000 Weber .................... A45D 34/04 132/200
6,286,517 B1 * 9/2001 Weber .................... A45D 29/00 132/200
6,336,694 B1 * 1/2002 Ishizaka ................. A45D 29/00 347/105
6,525,724 B1 * 2/2003 Takami .................. A45D 29/00 345/418
2003/0068098 A1 * 4/2003 Rondinelli ............ G06T 3/0062 382/276
2012/0274683 A1 * 11/2012 Yamasaki .............. B41J 3/4073 347/2
2016/0088197 A1 * 3/2016 Yamasaki .............. H04N 5/225 132/73.6
2016/0227900 A1 * 8/2016 Kumagai ............... A45D 31/00
2016/0345708 A1 * 12/2016 Walia ................... A45D 34/042

FOREIGN PATENT DOCUMENTS

JP 2003534083 A 11/2003

* cited by examiner

*Primary Examiner* — Ted Barnes
(74) *Attorney, Agent, or Firm* — Holtz, Holtz & Volek PC

(57) ABSTRACT

A drawing device includes: a mounting unit having a mounting surface on which a finger or a toe having a nail is placed; a drawing unit configured to draw at least one specific line on the nail placed on the mounting surface from a first direction; and a nail shape detection unit configured to acquire a specific picture by imaging the specific line from a second direction different from the first direction and to detect a curved shape of the nail in a width direction of the nail based on a shape of the specific line along the width direction in the specific picture.

16 Claims, 7 Drawing Sheets

DRAWING DEVICE AND METHOD FOR DETECTING SHAPE OF NAIL IN THE SAME

CROSS-REFERENCE TO RELATED APPLICATIONS

This application claims priority to Japanese patent application No. 2015-057073 filed on Mar. 20, 2015, which is incorporated by reference herein in its entirety.

BACKGROUND OF THE INVENTION

1. Field of the Invention

The present invention relates to a drawing device and a method for detecting a shape of a nail in a drawing device.

2. Description of the Related Art

There is generally known a drawing device for drawing a nail design on nails. Such a drawing device is described in JP 2003-534083 W.

With such a device, one can easily enjoy nail design without going to a nail salon.

However, a nail, which is a drawing target of a drawing device for nail print, has a curved shape that becomes lower and steeper toward both ends of a nail in the width direction.

Therefore, when a design image is drawn on a nail without consideration of the curved shape, the design becomes skewed and does not look beautiful.

In order to draw an image without skews on a nail, curve correction needs to be applied to drawing data so that the drawing data deals with the curved shape of the nail. However, the degree of curve of the curved shape of a nail depends on a person. Therefore, it is not possible to determine a constant correction value to make a correction. It is necessary to make a correction according to the degree of curve of the curved shape of each nail of a user.

As a method to obtain curved shape of an object, a light section method is known. In the light section method, a surface of the object is irradiated with line laser light, line formed on the surface of the object by the line laser light is imaged from the oblique direction, and the three-dimensional shape (change of the shape in the height direction and the curved shape) of the object is obtained based on this image.

However, when the object is a nail, laser light irregularly reflects or diffuses on a surface of the nail depending on the surface condition of the nail, and therefore, a line formed on the surface of the nail by the line laser light sometimes blurs. In that case, it is difficult to accurately measure the curved shape of the nail.

Furthermore, when a light section method is used, it becomes necessary to include an irradiation unit for generating line laser light in a drawing device. It leads to increase in size and weight of a device.

In addition, an irradiation unit is a unit not necessary for drawing in a drawing device and has not been included in a drawing device. Therefore, if an irradiation unit is included, increase in cost of a drawing device because of an irradiation unit is inevitable.

BRIEF SUMMARY OF THE INVENTION

The present invention has an advantage that the present invention provides a drawing device and a method for detecting a shape of a nail in a drawing device that can precisely detect the curved shape of the nail with simple and inexpensive structures without adding a special unit for detecting the curved shape of the nail.

According to an embodiment of the present invention, there is provided a drawing device including: a mounting unit having a mounting surface on which an object is placed, the object is a finger or a toe having a nail; a drawing unit configured to draw from a first direction at least one specific line by a drawing material on the nail placed on the mounting surface; and a nail shape detection unit configured to acquire from a second direction different from the first direction a specific picture by imaging the specific line and to detect a curved shape of the nail in a width direction of the nail based on a shape of the specific line along the width direction in the specific picture.

According to another embodiment of the present invention, there is provided a drawing device including: a drawing unit configured to draw a design on a nail of an object which is a finger or a toe; and a nail shape detection unit configured to acquire a specific picture by imaging at least one specific line drawn on the nail by the drawing unit and to detect a curved shape of the nail in a width direction of the nail based on a shape of the specific line along the width direction in the specific picture.

According to another embodiment of the present invention, there is provided a method for detecting a shape of a nail in a drawing device, wherein the drawing device has a mounting unit having a mounting surface on which an object is placed, the object is a finger or a toe having a nail, the method for detecting the shape of the nail including the steps of: causing a drawing unit configured to draw at least one specific line by a drawing material on the nail placed on the mounting surface from a first direction; acquiring a specific picture by imagining the specific figure from a second direction different from the first direction; and detecting a curved shape of the nail in the width direction based on a shape of the specific line along the width direction in the specific picture.

DETAILED DESCRIPTION OF THE INVENTION

Figure 1:
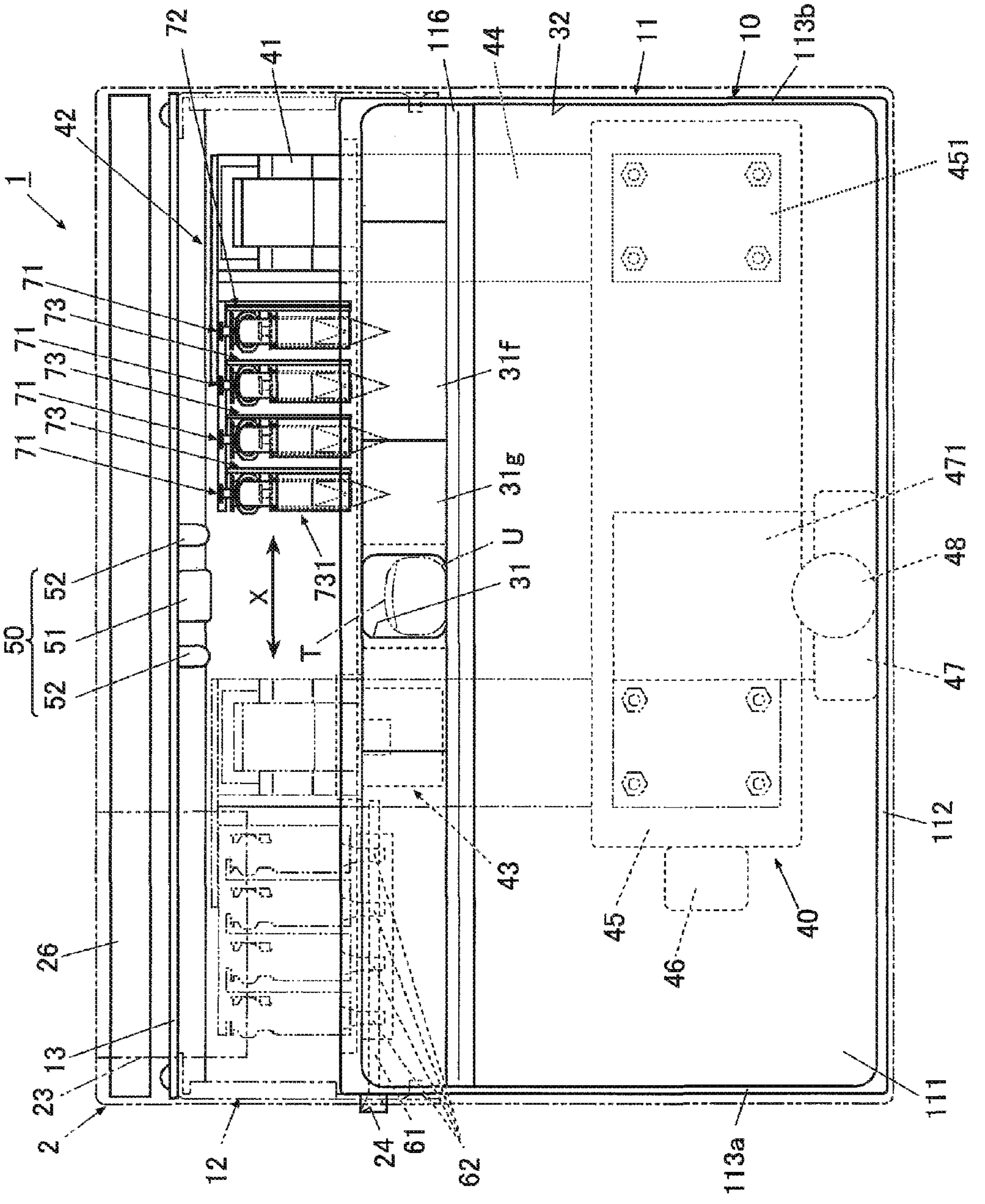
FIG. 1 is a front view of a drawing device according to one embodiment of the present invention.

Embodiments of a drawing device and a method for detecting a shape of a nail in a drawing device according to the present invention will be described in detail below with reference to the drawings.

Note that the scope of the invention is not limited to the examples illustrated in the drawings.

In the following embodiments, a drawing device will be described as a device for drawing on a nail of a hand finger. However, the drawing target of the present invention is not limited to a nail of a hand finger. For example, the drawing target may be a nail of a foot finger.

FIG. 1 is a front view of a drawing device.

Figure 2:
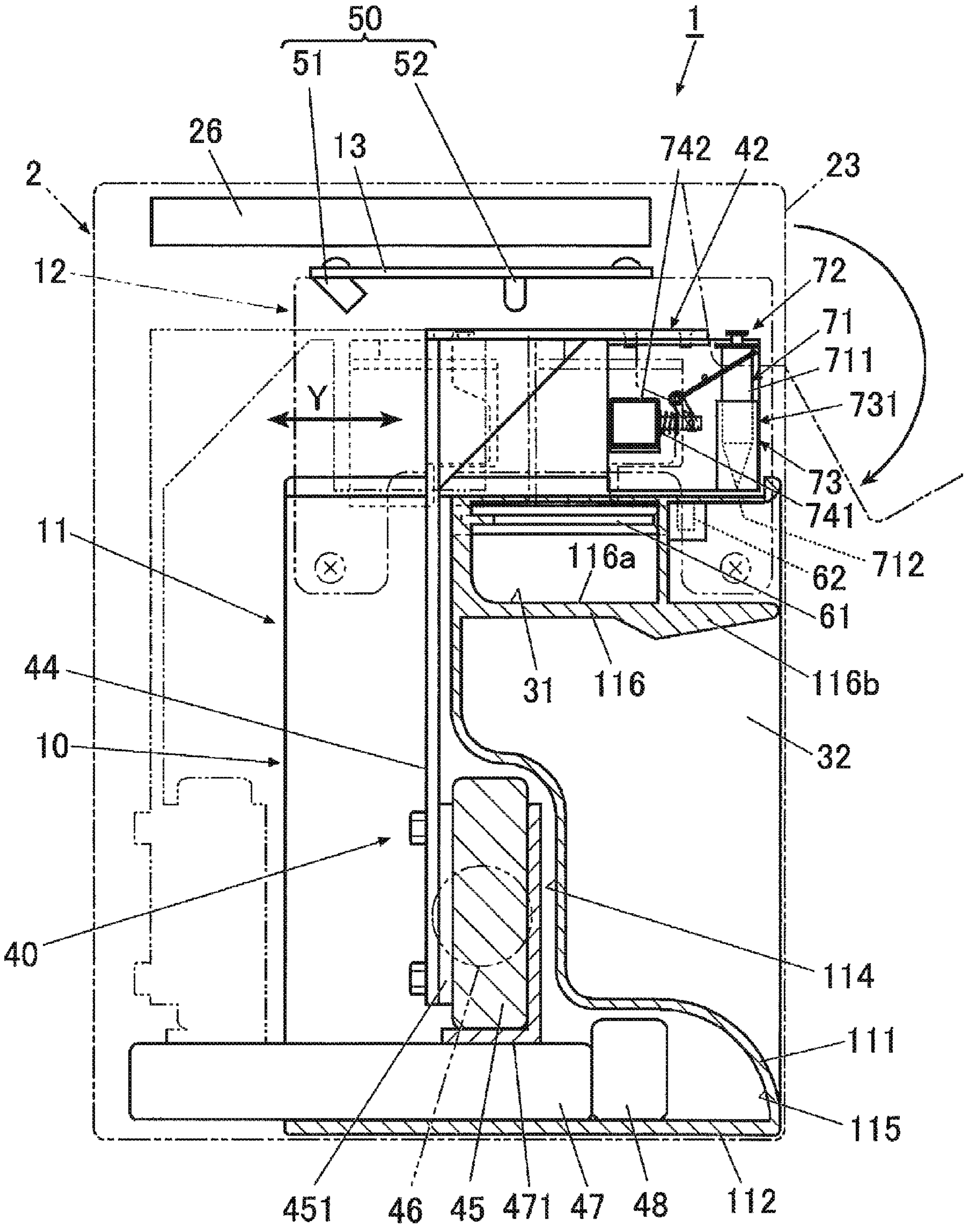
FIG. 2 is a sectional side view illustrating an internal structure of the drawing device illustrated in FIG. 1, where the cross-section of a part of the drawing device is shown.

FIG. 2 is a side view illustrating an internal structure of the drawing device illustrated in FIG. 1, where the cross-section of a part of the drawing device is shown.

As illustrated in FIGS. 1 and 2, a drawing device 1 is a hybrid nail print device including a drawing head 41 for discharging a drawing material such as ink to draw a design and drawing tools 71 (for example, writing materials) for applying a drawing material such as ink in contact with a drawing target such as a pen. The drawing device 1 includes a case body 2 and a device body 10 included in the case body 2.

Note that, in FIGS. 1 and 2, the case body is shown by two-dot chain line.

A drawing tool exchange cap 23, which can be opened and closed for exchanging the drawing tools 71 of a drawing unit 40 (described later), is provided at one end of upper front of the case body 2. As illustrated in FIG. 2, the drawing tool exchange cap 23 can freely move between a closed state and an open state by a hinge, for example.

Furthermore, at a position corresponding to a drawing tool test unit 61 (described later) on one side of the case body 2 (left side in FIG. 1 in the present embodiment), an insertion opening 24 for exchanging a drawing target (not illustrated) to be put on a drawing tool test unit 61 is formed.

A controller 25 (see FIG. 6) is provided on an upper face (top panel) of the case body 2.

The controller 25 is an input unit which the user uses to give various inputs.

The controller 25 includes control buttons to give various inputs (not illustrated) such as a power switch button to turn on the drawing device 1, a stop switch button to stop an operation of the drawing device 1, a design select button to select a design image to be drawn on a nail T, and a drawing start button to start drawing, for example.

A display 26 is provided roughly in the center of the upper face (top panel) of the case body 2.

The display 26 is a flat panel display, for example, such as a liquid crystal display (LCD) and an organic electroluminescence display.

In the present embodiment, a finger image obtained by imaging a print finger U1 (image of a print finger U1 including an image of the nail T), an image such as an outline of the nail T included in the finger image, a design select page for selecting a design image to be drawn on the nail T, a thumbnail image for checking the design, and an instruction page showing various instructions are shown on the display 26 as appropriate, for example.

The display 26 may have a touch panel on its surface. In this case, the user may touch the surface of the touch panel by a finger tip, for example, to give various selections and instructions. The user may also touch the surface of the display 26 by a stylus pen or a stick-shaped writing material with a narrow tip instead of a finger, for example, to give various inputs.

The device body 10 has a nearly box shape, and includes a lower case 11 provided at the inner and lower side of the case body 2 and an upper case 12 provided above the lower case 11 and at the inner and upper side of the case body 2.

Now, the lower case 11 will be described.

The lower case 11 includes a back plate 111, a bottom plate 112, a pair of side plates 113*a* and 113*b*, an X-direction moving stage case 114, a Y-direction moving stage case 115, and a partition wall 116.

The lower ends of the side plates 113*a* and 113*b* are connected to the left and right ends of the bottom plate 112 respectively, so that the side plates 113*a* and 113*b* are vertical against the bottom plate 112.

As illustrated in FIG. 2, a lower part of the back plate 111 has two steps forward (toward the near side of the finger insertion direction).

The lower end of the back plate 111 is connected to the front end of the bottom plate 112, and the back plate 111 divides an area surrounded by the bottom plate 112 and the side plates 113*a* and 113*b* in the forward and backward direction.

Spaces formed behind the stepped back plate 111 are the X-direction moving stage case 114 and the Y-direction moving stage case 115 (see FIG. 2).

An X-direction moving stage 45 of the drawing unit 40 is housed in the X-direction moving stage case 114 when the drawing unit 40 (see FIG. 2) moves forward (toward the near side of the finger insertion direction).

A Y-direction moving stage 47 of the drawing unit 40 is provided in the Y-direction moving stage case 115.

The partition wall 116 is provided inside the lower case 11 so that a space at the inner and front side of the lower case 11 (space of the near side of the finger insertion direction surrounded by the back plate 111, the bottom plate 112, and the side plates 113*a* and 113*b*) is divided in the upward and downward direction.

The partition wall 116 is provided almost horizontally. The left and right ends of the partition wall 116 are connected to the side plates 113*a* and 113*b* respectively, and the rear end of the partition wall 116 is connected to the back plate 111.

A finger support 30 is formed integrally with the lower case 11.

The finger support 30 will be described with reference to FIG. 3.

Figure 3:
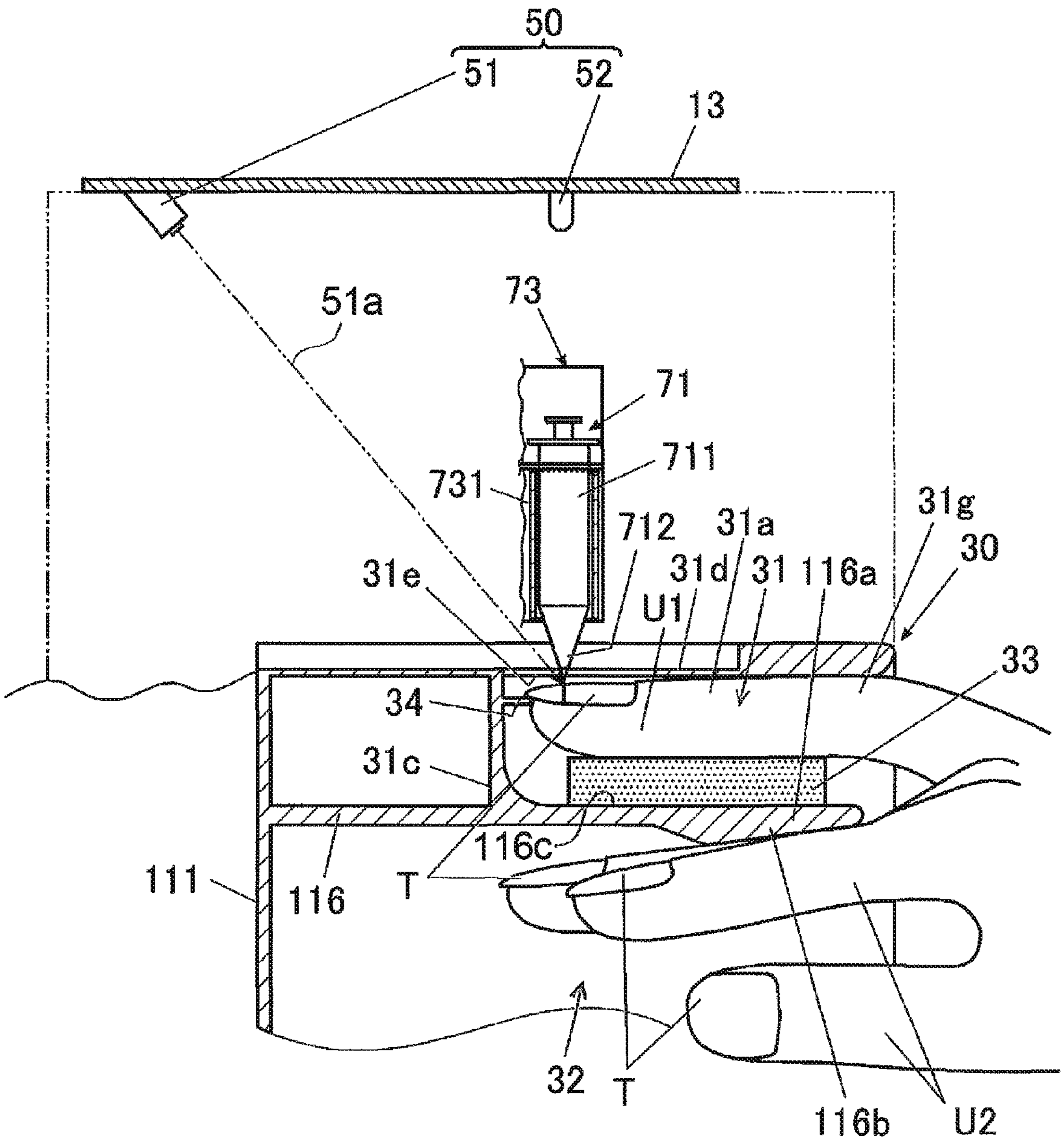
FIG. 3 is a main sectional view schematically illustrating a finger support and a structure around the finger support.

FIG. 3 is a main sectional view schematically illustrating the finger support 30 and a structure around the finger support 30.

The finger support 30 includes a finger receiving unit 31 for receiving a finger corresponding to a nail T, on which a design is drawn and which is a drawing target, (hereinafter referred to as "print finger U1") and a finger escaping unit 32 for sheltering fingers other than the print finger U1, which are not drawing targets (hereinafter referred to as "non-print fingers U2").

The finger receiving unit 31 is provided on the upper side of the partition wall 116 and roughly in the center of the lower case 11 in the width direction. A space on the lower side of the lower case 11 formed by the partition wall 116 is the finger escaping unit 32.

For example, in order to draw a design on the nail T of the ring finger, the user inserts the ring finger (print finger U1) into the finger receiving unit 31, and inserts other four fingers (non-print fingers U2, i.e., thumb, index finger, middle finger, and pinky finger) into the finger escaping unit 32 as illustrated in FIG. 3.

The finger receiving unit 31 is open in the front side of the lower case 11 (near side of the print finger insertion direction), and is surrounded by a finger mounting unit 116*a* which is a part of the partition wall 116 on the lower side, partitions 31*a* on the left and right sides, and a partition 31*c* on the back side.

The finger mounting unit 116*a* has a mounting surface (XY plane) 116*c* on its upper face. The finger with the nail T on which a design is drawn (print finger U1) is placed on the mounting surface 116*c*.

The upper side of the finger receiving unit 31 is surrounded by a roof 31*d*.

The roof 31*d* has a window 31*e* for exposing the nail T of the print finger U1 inserted into the finger receiving unit 31.

A finger support 33 for supporting the print finger U1 inserted into the finger receiving unit 31 from the lower side is provided on the mounting surface 116*c* of the finger mounting unit 116*a*.

The finger support 33 may be moved upward and downward by a unit not illustrated. In this case, the finger support 33 moves down to the position so that the finger support 33 does not block insertion and takeout of the print finger U1 when the user inserts or takes out the print finger U1 into and from the finger receiving unit 31, and the finger support 33 moves up so that the finger support 33 pushes the print finger U1 up to the position where the upper face of the print finger U1 contacts the lower face of the roof 31*d* when the user fixes the print finger U1.

A nail rest 34 projecting out from the partition 31*c* is provided in the finger receiving unit 31, and the tip of the nail T rests on the nail rest 34 while the print finger U1 is pushed up by the finger support 33. Accordingly, the position of the nail T in the height direction is fixed at a certain position.

Note that the finger support 33 and the nail rest 34 are not essential for the drawing device of the present embodiment. The drawing device may not have these components.

A front wall 31*f* (see FIG. 1) that covers the front side of the lower case 11 is provided to stand on the upper face of the partition wall 116 and at both sides of the front side of the lower case 11.

A pair of guide walls 31*g* that becomes narrower from the end near the center of the front wall 31*f* toward the finger receiving unit 31 and guides the print finger U1 to the finger receiving unit 31 is provided to stand on the upper face of the partition wall 116.

The user can have the partition wall 116 between the print finger U1 inserted into the finger receiving unit 31 and the non-print fingers U2 inserted into the finger escaping unit 32. Therefore, the print finger U1 inserted into the finger receiving unit 31 is stably fixed.

In the present embodiment, a projection 116*b* that projects downward is formed at the front end of the partition wall 116.

The projection 116*b* is tapered, that is, the thickness of the projection 116*b* gradually reduces toward the near side and gradually increases toward the back side. The entire thickness of the projection 116*b* may be thick relative to the step on the back side of the partition wall 116.

Since the projection 116*b* is formed at the front end of the partition wall 116, a space is formed between the finger with the nail T on which the design has been drawn and the lower face of the partition wall 116 when the non-print fingers U2 are inserted into the finger escaping unit 32. Accordingly, it is possible to prevent adherence of a drawing material such as ink applied on the nail T to the device and damage of the design drawn on the nail T, which are caused by contact of the nail T with the lower face of the partition wall 116.

An area on the upper face of the partition wall 116 and at the side of the finger receiving unit 31 (the position corresponding to the insertion opening 24 of the case body 2; in the present embodiment, the left side in FIG. 1) is a home area where the drawing head 41 and the drawing tools 71 stand by when a design is not being drawn.

In the home area, the drawing tool test unit 61, drawing tool caps 62, and a head cap unit 43 are provided.

The drawing tool test unit 61 is a unit for test writing of the drawing tools 71 (described later) and is located in the drawing area of the drawing tools 71.

The drawing tool test unit 61 has a flat shape, and a flat drawing target inserted from the insertion opening 24 of the case body 2 described above is placed on the drawing tool test unit 61.

A drawing target placed on the drawing tool test unit 61 may be anything as long as pen tips 712 can be tried, for example, paper slip.

It is preferable that the drawing tool test unit 61 be provided at almost the same height as the nail T when the print finger U1 is inserted into the finger receiving unit 31.

The purpose of the drawing tool test unit 61 is to carry down the drawing tools 71 on the drawing target and have the drawing tools 71 tried by drawing certain figures such as "O" and "∞" before drawing of image data on the nail T is started to make the condition of the pen tips 712 better in order to prevent smudge in the beginning of drawing due to pen tips 712 being dried or bad ink absorption, for example.

Figures being drawn for test writing is not particularly limited; however, simple figures such as "O" and "∞" are preferable so that ink is not wasted.

It is preferable that positions where the figures such as "O" and "∞" are drawn be shifted little by little in every test writing in the moving range of the drawing tool test unit 61.

When almost the entire drawing target is filled with the figures of test writings, the display 26 shows a page to ask the user to exchange the drawing targets, for example, "Please exchange papers."

In this case, the user will take out the drawing target through the insertion opening 24 and replace the old one with new one so that test writing can be carried out on the new drawing target.

If the drawing target is roll paper, a new drawing target is pulled out from the roll paper when there is no more drawing space so that test writing can be carried out on the new drawing surface.

The drawing tool caps 62 house the drawing tools 71 (especially the pen tips 712 of the drawing tools 71) when the drawing tools 71 are fixed to the drawing unit 40 and a design is not being drawn. The drawing tool caps 62 are made of rubber, for example.

In the present embodiment, the drawing tool caps 62 are located in front of the drawing tool test unit 61 (near side of the finger insertion direction).

The number of the drawing tool caps 62 is the same as the number of the drawing tools 71 that can be fixed to the drawing unit 40 (in the present embodiment, four drawing tool caps 62).

When a design is not being drawn, the drawing tools 71 move down by a solenoid 742 (described later) after the drawing tools 71 has moved to just above the drawing tool caps 62, and the pen tips 712 are housed in the drawing tool caps 62. Accordingly, it can be possible to prevent the pen tips 712 from being dried when a design is not being drawn.

The shape of the drawing tool caps 62 is not limited to the illustration in the figures. The shape of the drawing tool caps 62 may be long groove that can house the pen tips 712 of all of the drawing tools 71 to be fixed to the drawing unit 40.

In the present embodiment, since the drawing tool caps 62 are provided near the drawing tool test unit 61 as described, it is possible to carry out test writing with the drawing tool test unit 61 near the drawing tools 71 after the drawing tools 71 have moved up and then to start drawing. Therefore, it is possible to minimize the time required for the drawing tools 71 to move, realizing quick drawing operation.

The head cap unit 43 covers a discharge surface of the drawing head 41 when a design is not being drawn.

The head cap unit 43 is provided at the position above the partition wall 116 and corresponding to the position where the drawing head 41 is provided when the drawing tools 71 are housed in the drawing tool caps 62.

To cover the discharge surface of the drawing head 41 by the head cap unit 43 when a design is not being drawn can prevent the drawing head 41 from being dried when a design is not being drawn.

The drawing unit 40 draws a design on the nail T based on the image data of the selected design image with a drawing material such as several types of ink.

In the present embodiment, the drawing unit 40 includes a carriage 42 having the drawing head 41 and a drawing tool unit 72 that includes the drawing tools 71.

The carriage 42 is fixed to a carriage supporter 44 so that the drawing head 41 and the drawing tool unit 72 are supported by the carriage supporter 44 through the carriage 42.

The drawing unit 40 includes an X-direction moving stage 45 and an X-direction moving motor 46 for moving the carriage 42 in the X-direction (X-direction in FIG. 1, left-right direction of the drawing device 1) and a Y-direction moving stage 47 and a Y-direction moving motor 48 for moving the carriage 42 in the Y-direction (Y-direction in FIG. 2, front-back direction of the drawing device 1) in addition to the carriage 42 and the carriage supporter 44 for supporting the carriage 42.

The drawing head 41 is an ink-jet drawing tool for spraying a liquid drawing material such as ink on the surface of the nail T (drawing target surface) to draw a design.

The structure and the method of spraying ink by the drawing head 41 are not particularly limited.

The drawing head 41 according to the present embodiment is an integrated cartridge including an ink tank, for example. The ink tank includes several partitioned ink spaces (ink housings, not illustrated). Each of the ink spaces is filled with ink of three colors of C, M, and Y as liquid materials, for example. The type and the number of ink (liquid material, drawing material) are not limited to the example described here A discharge surface with an outlet for discharging ink of each color filled in the ink space (not illustrated) is provided on the lower side surface of the drawing head 41 (surface facing the finger mounting unit 116*a* when the drawing head 41 is fixed to the carriage 42).

The drawing head 41 includes an ink discharger 411 for discharging ink from the discharging outlet on the discharge surface. The ink discharger 411 includes a piezoelectric element (not illustrated) as an actuator, for example.

The carriage 42 includes a head drive circuit substrate (not illustrated) for driving the drawing head 41.

A connector (not illustrated) of the drawing head 41 is connected to the head drive circuit substrate when the drawing head 41 is fixed to the carriage 42, and the ink discharger 411 is electrically connected to a controller 80 through the head drive circuit substrate.

Accordingly, a driving voltage is applied to the piezoelectric element included in the ink discharger 411 according to the control by a drawing control unit 815 described later. Then, the piezoelectric element deforms or vibrates by voltage application to compress an ink channel (not illustrated) so that the ink is discharged from the discharging outlet on the discharge surface.

The drawing tool unit 72 includes at least one drawing tool 71 that draws a design on the nail T of the print finger U1.

The drawing tool 71 is held by a drawing tool holder 73 in an almost perpendicular direction to a plane direction of the mounting surface 116*c*.

In the present embodiment, the drawing tool unit 72 has four drawing tool holders 73 (described later), each of the drawing tool holders 73 holding one drawing tool 71. The number and the shape of the drawing tool holder 73 are not limited to the illustration of the figures.

The drawing tools 71 can be appropriately exchanged by opening the drawing tool exchange cap 23 described above.

Note that, the drawing tools 71 may be held by all of the drawing tool holders 73, or by only one or more of four drawing tool holders 73.

The drawing tools 71 come in contact with the surface of the nail T to apply a drawing material such as ink (liquid material) on the surface of the nail T to draw a design from the almost perpendicular direction (a first direction) to the plane direction of the mounting surface 116*c*.

Each of the drawing tools (writing materials) 71 held by drawing tool holder 73 has a pen axis 711 and a pen tip 712 provided to the tip of the pen axis 711.

The inside of the pen axis 711 is an ink container for containing various types of ink.

The viscosity and the particle diameter of color materials (grain size) of the ink contained inside the pen axis 711 are not particularly limited. For example, ink with gold and silver shiny materials, white ink, UV-curable ink and gel nail, under coating ink, top coating ink, and manicure can be used as the ink, for example.

In the present embodiment, at least one of the drawing tools 71 is the drawing tools 71 for drawing at least one straight line La (see FIG. 4) for nail shape detection on the surface of the nail T. Ink for drawing a line with a color clearly distinct from the color of the nail T and the skin of the finger is contained inside the pen axis 711 of the drawing tools 71 for drawing lines. The line La is a specific line (a specific figure) for nail shape detection according to one embodiment of the present invention.

The color of the ink for drawing a line is not particularly limited as long as it is distinct from the nail T and the skin. The color of the ink for drawing a line is preferably a color far from the color of the nail and the skin in terms of HSV color space (HSV model, i.e., color space with three components of saturation and chroma, and value, lightness, and brightness), for example, blue or green.

For highly precise detection by a nail shape detection unit 812*b* described later, it is preferable that the line La be relatively thin. Therefore, it is preferable that the drawing tools 71 for drawing a line have relatively narrow pen tips 712 that can draw lines as narrow as possible.

For example, the drawing tools 71 are pens with the pen tips 712 of ball point pen type from which ink contained in the pen axes 711 exudes by pushing the pen tips 712 on the surface of the nail T to draw a design.

The drawing tools 71 are not limited to ball point pen type. The drawing tools 71 may be felt pen type with which a design is drawn by transfusing ink to felt pen tips or calligraphy pen type with which a design is drawn by transfusing ink to bundled brushes. Pens with variety of diameters of the pen tips 712 can be used.

If several drawing tools 71 are held by each drawing tool holder 73, drawing tools 71 may be pens with the same types of pen tips 712 or may be pens with different types of pen tips 712.

In the present embodiment, four drawing tool holders 73 for holding the drawing tools 71 are arranged in the width direction (left-right direction, X-direction in FIG. 1) of the device. Therefore, the positions of the pen tips 712 of the drawing tools 71 held by each drawing tool holder 73 are shifted from one another in the X-direction (left-right direction of the device). However, since the shift amount is set as integral multiple of one step of drawing operation and a design is drawn with adjustment by the number of the steps of the shift according to the drawing tools 71 used for drawing, the four drawing tools 71 can draw a design on the same positions.

Each drawing tool holder 73 includes a drawing tool holder 731 that is a tube for holding the drawing tools 71 in the almost perpendicular direction to the plane direction of the mounting surface 116*c*.

The drawing tool holder 731 moves the drawing tools 71 upward and downward with cooperation of a spring 741 and the solenoid 742 with the drawing tools 71 held almost vertically.

Specifically, the drawing tools 71 moves downward against energizing force of the spring 741 when the solenoid 742 is driven and the drawing tools 71 are ready to come in contact with the surface of the nail T or the drawing target. That is, the drawing tools 71 are ready to draw a design.

When the solenoid 742 is open, the drawing tools 71 move upward by energizing force of the spring 741, and the drawing tools 71 does not contact the surface of the nail T or the drawing target. That is, the drawing tools 71 are not ready to draw a design.

In the present embodiment, the solenoid 742 is used as an actuator to move the drawing tools 71 upward and downward. However, the actuator for moving the drawing tools 71 upward and downward is not limited to the solenoid 742. Since the drawing tools 71 are light in weight, the actuator for moving the drawing tools 71 upward and downward may be various types of small driving devices such as a small motor instead of a solenoid.

The carriage supporter 44 for supporting the carriage 42 is fixed to an X-direction moving unit 451 attached to the X-direction moving stage 45.

The X-direction moving unit 451 moves in the X-direction on the X-direction moving stage 45 along a guide (not illustrated) by driving force of the X-direction moving motor 46. Accordingly, the carriage 42 moves in the X-direction (X-direction in FIG. 1, left-right direction of the drawing device 1).

The X-direction moving stage 45 is fixed to a Y-direction moving unit 471 of a Y-direction moving stage 47. The Y-direction moving unit 471 moves in the Y-direction on the Y-direction moving stage 47 along a guide (not illustrated) by driving force of a Y-direction moving motor 48. Accordingly, the carriage 42 moves in the Y-direction (Y-direction in FIG. 2, front-back direction of the drawing device 1).

In the present embodiment, a set of the X-direction moving motor 46, a ball screw (not illustrated), and the guide (not illustrated) makes up the X-direction moving stage 45, and a set of the Y-direction moving motor 48, a ball screw (not illustrated), and the guide (not illustrated) makes up the Y-direction moving stage 47.

As the X-direction moving motor 46 and the Y-direction moving motor 48 of the present embodiment, a step motor, which moves by certain distance every one pulse, is used.

In the present embodiment, components such as the X-direction moving motor 46 and the Y-direction moving motor 48 make up a carriage driver 49 (see FIG. 6) that drives the carriage 42 including the drawing tools 71 for drawing a design on the nail T in the X- and Y-directions.

The ink discharger 411 of the drawing head 41, the solenoid 742 for moving the drawing tools 71 upward and downward, the X-direction moving motor 46, and the Y-direction moving motor 48 in the drawing unit 40 are connected to the drawing control unit 815 (see FIG. 6) of the controller 80 described later and are controlled by the drawing control unit 815.

As illustrated in FIGS. 1 and 2, an imaging section 50 is provided in the upper case 12.

That is, a substrate 13 is provided in the upper case 12, and a camera 51 as an imaging device is provided at the position that is the center of the substrate 13 in the left-right direction (that is, X-direction in FIG. 1) and on the lower face of the back side of the device (that is, left side in FIG. 2) in the front-back direction (that is, Y-direction in FIG. 2).

It is preferable that the camera 51 have about two million pixels or more.

The camera 51 is a device to image the nail T of the print finger U1 inserted into the finger receiving unit 31 to acquire a finger image (image of the print finger U1 including an image of the nail T).

In the present embodiment, the camera 51 is provided at a position where the straight line La (see FIG. 4) drawn on the surface of the nail T by the drawing tools 71 along the width direction of the nail T is imaged from the obliquely upward direction (a second direction) in the direction orthogonal to the width direction of the nail T. That is, the camera 51 also functions as a line imaging section for obtaining a line image Lb (see FIG. 5) corresponding to the line La.

Therefore, the camera 51 tilts toward the finger receiving unit 31 from the back side of the device, for example. The camera 51 images the nail T of the print finger U1 inserted into the finger receiving unit 31 from the obliquely upward direction shifted to the extending direction of the finger from just above the nail T (in the present embodiment, from the obliquely upward direction of nail tip direction).

Specifically, as illustrated in FIG. 3, the camera 51 is provided in the direction with an inclined angle of almost 45°, for example, against the plane direction of the mounting surface 116*c* in the virtual vertical surface along the insertion direction of the print finger U1 against the finger receiving unit 31 where a light axis 51*a* of the camera 51 (lens of the camera 51 not illustrated) is vertical to the mounting surface 116*c* of the finger mounting unit 116*a* and orthogonal to the width direction of the nail T.

Note that the position and the inclined angle of the camera 51 are not limited to the example described above. The position and the inclined angle of the camera 51 may be any as long as the camera 51 can image the entire nail T and can image the line La from the obliquely upward direction with a certain level of angle.

As described later, in the present embodiment, the nail shape detection unit 812*b* detects the shape of the outline of the nail T from a finger image acquired by the camera 51 and detects the shape of the surface of the nail T in the width direction with a triangulation principle based on the shape of the acquired line image Lb and a value of the inclined angle of the camera 51.

Therefore, it is preferable that the camera 51 be provided at a position where the nail T can be imaged from a position shifted to the extending direction of the finger with a certain level of angle (for example, about 30° to 70°), not from just above or just beside the nail T.

Lights (illuminating devices) 52 such as white LEDs are provided on the substrate 13.

The lights 52 illuminate the nail T of the print finger U1 when the camera 51 images the nail T of the print finger U1. The lights 52 are provided just above the nail T or its vicinity as illustrated in FIG. 3 and other figures, for example.

The imaging section 50 includes the camera 51 and the lights 52.

The imaging section 50 is connected to an imaging control unit 811 of the controller 80 described later (see FIG. 6) and controlled by the imaging control unit 811.

Image data of an image imaged by the imaging section 50 is stored in a nail image storage area 821 in a memory 82 described later.

The controller 80 is provided to the substrate 13 provided in the upper case 12, for example.

Figure 6:
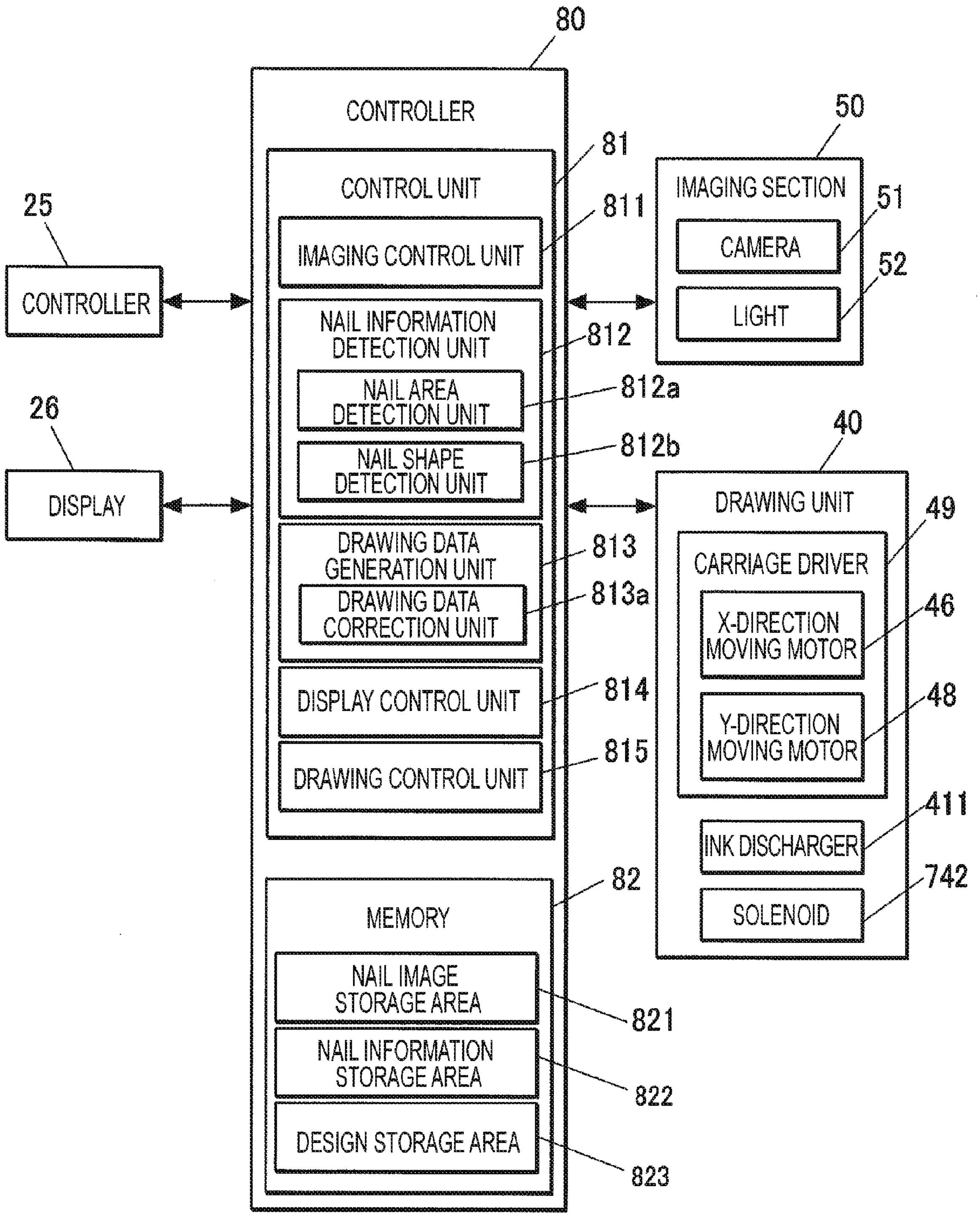
FIG. 6 is a main block diagram illustrating a control structure of the drawing device according to one embodiment of the preset invention.

FIG. 6 is a main block diagram illustrating a control structure according to the present embodiment.

As illustrated in FIG. 6, the controller 80 is a computer that includes a control unit 81 including a CPU (Central Processing Unit) and the memory 82 including a ROM (Read Only Memory) and a RAM (Random Access Memory) (not illustrated).

The memory 82 stores various programs for operating the drawing device 1 and various data.

Specifically, the ROM of the memory 82 stores various programs such as a nail information detection program for detecting nail information such as the outline shape and the position of the nail T and the curvature and the end inclined angle of the curved shape of the nail T from the finger image, a drawing data generation program for generating drawing data, and a drawing program for drawing a design. Each part of the drawing device 1 is entirely controlled by executing these programs by the controller 80.

The memory 82 according to the present embodiment includes a nail image storage area 821 for storing the finger image including the image of the nail T of the print finger U1 of the user acquired by the imaging section 50, a nail information storage area 822 for storing nail information detected by a nail information detection unit 812, and a design storage area 823 for storing the image data of the design image to be drawn on the nail T.

The nail information storage area 822 stores combinations of information for identifying the user and types of the finger and nail information about the nail T of each finger.

From the functional point of view, the control unit 81 includes an imaging control unit 811, the nail information detection unit 812, a drawing data generation unit 813, a display control unit 814, and the drawing control unit 815.

Functions of the imaging control unit 811, the nail information detection unit 812, the drawing data generation unit 813, the display control unit 814, and the drawing control unit 815 are realized by a cooperation of the CPU of the control unit 81 and a program stored in the ROM of the memory 82.

The imaging control unit 811 controls the camera 51 and the lights 52 of the imaging section 50 to cause the camera 51 to image the nail T of the print finger U1 inserted into the finger receiving unit 31.

In the present embodiment, the imaging control unit 811 controls the camera 51 and the lights 52 the imaging section 50 to image the nail T of the print finger U1. Accordingly, the imaging control unit 811 acquires the finger image including the image of the nail T imaged by the camera 51.

The imaging control unit 811 controls the camera 51 and the lights 52 of the imaging section 50 as a line imaging section to image the nail T with the straight line La for nail shape detection drawn on the surface of the nail T in the width direction of the nail T by the drawing tools 71 of the drawing unit 40 from the oblique direction. Accordingly, the imaging control unit 811 acquires the finger image including the line image Lb corresponding to the line La and the image of the nail T.

The nail information detection unit 812 detects the nail information of the nail T of the print finger U1 based on the finger image including the image of the nail T of the print finger U1 imaged by the camera 51 and acquired by the imaging control unit 811.

According to the present embodiment, the nail information detection unit 812 includes a nail area detection unit 812*a* and the nail shape detection unit 812*b*.

The nail information described herein includes the shape and the size of the outline of the nail T, the position (horizontal position) of the nail T, the curvature and the end inclined angle of the curved shape of the nail T, and the information on the classified curve pattern descried later.

The nail area detection unit 812*a* detects the outline of the nail T and detects the entire area formed by the outline of the nail T as a nail area. The nail area detected by the nail area detection unit 812*a* will be a drawing area on which a design is drawn by the drawing unit 40.

The nail shape detection unit 812*b* detects the shape of the surface of the nail T in the width direction as the curved shape of the nail T.

Now, detection of the nail information by the nail information detection unit 812 will be specifically described.

The nail area detection unit 812*a* detects the shape, the size, and the position of the outline of the nail T based on difference of the colors between the nail T and the other area of the finger according to the finger image including the nail image of the nail T of the print finger U1 imaged by the camera 51 and acquired by the imaging control unit 811 for example, and obtains this outline as outline information of the nail T represented by xy coordinate. Since the camera 51 images the nail T from the obliquely upward direction, the finger image acquired by imaging has a deformation corresponding to the inclined angle of the camera 51 against the nail T. Therefore, the nail area detection unit 812*a* corrects the deformation to acquire the finger image with the correct shape.

The method for detecting the outline (such as shape) of the nail T by the nail area detection unit 812*a* is not limited to the method described herein.

The nail shape detection unit 812*b* detects the shape of the part of the surface of the nail T on which the line La is drawn in the width direction as the curved shape of the nail T based on the shape of the line image Lb corresponding to the line La for nail shape detection in the finger image including the nail image of the nail T imaged by the camera 51 and acquired by the imaging control unit 811.

In the present embodiment, the nail shape detection unit 812*b* first detects the line image Lb from the finger image based on difference of the colors from the nail T and the finger.

Then, the nail shape detection unit 812*b* detects the curved shape of the nail with a triangulation principle based on the shape of the line image Lb.

That is, the position and the inclined angle of the camera 51 are set in advance in the device, and the set values are known. The value of the position of the line La drawn by the drawing tools 71 is recognized by the drawing control unit 815 described later.

Figure 4:
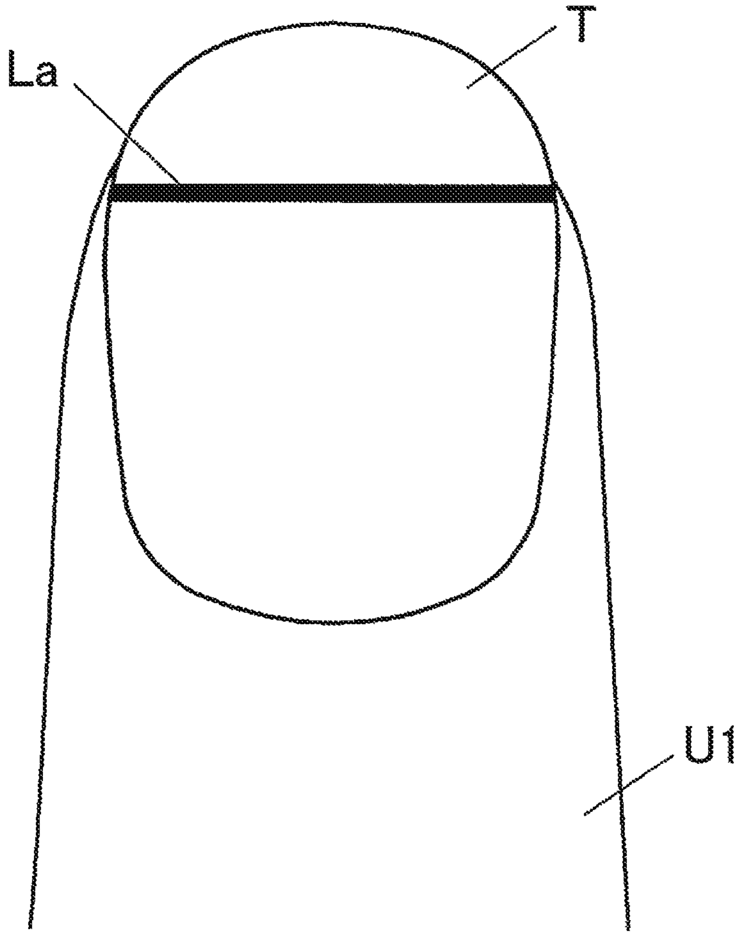
FIG. 4 is a plan view of a surface of a nail on which a line for nail shape detection is drawn.
Figure 5:
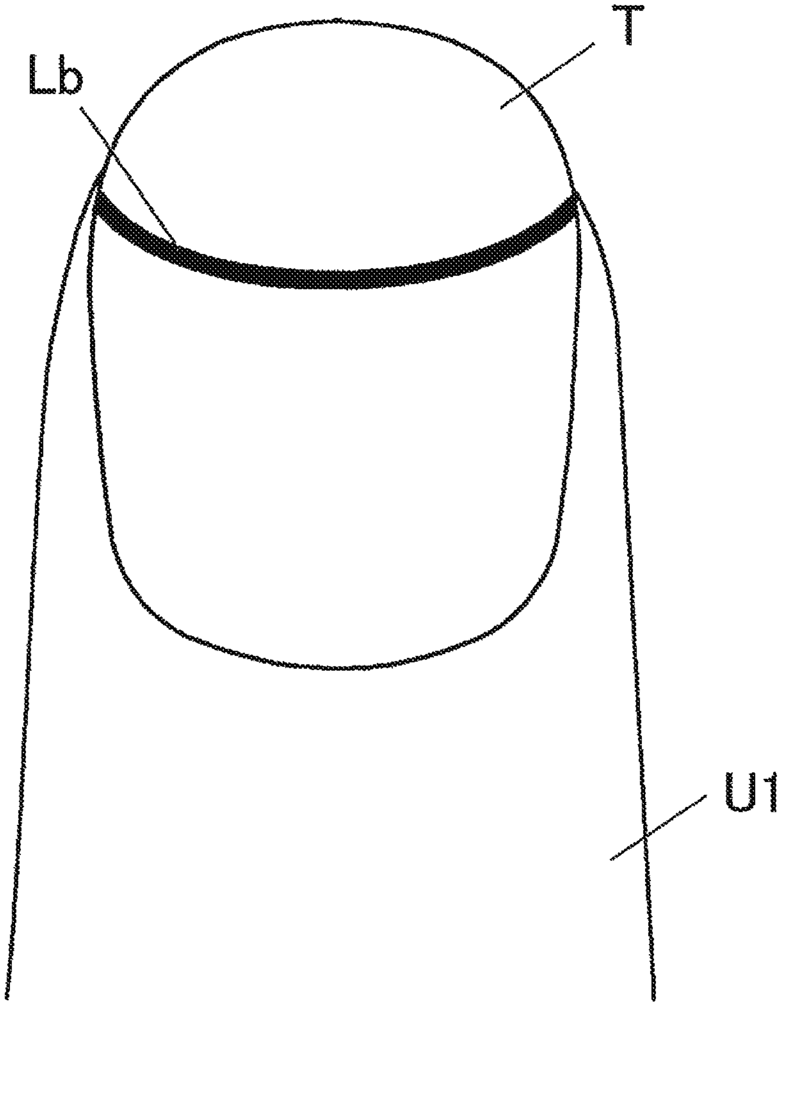
FIG. 5 illustrates one example of a finger image obtained by imaging the nail with the line illustrated in FIG. 4 by a camera.

As illustrated in FIG. 4, when the surface of the nail T with the straight line La drawn along the width direction of the nail T is imaged from the obliquely upward direction shifted from just above the line La to the extending direction of the finger, the finger image including the arc line image Lb, which is the line La curved according to the curved shape of the nail T (image of the print finger U1 including the image of the nail T) as illustrated in FIG. 5, is imaged.

The nail shape detection unit 812*b* calculates a change of the actual vertical position of the area of the nail T on which the line La is drawn along the width direction of the nail T with a triangulation principle based on the shape of the line image Lb and the value of the inclined angle of the camera 51 (that is, a change of the nail T in the width direction in the vertical direction distance orthogonal to the mounting surface 116*c* from an arbitrary reference position to the surface of the nail T at a part of the nail T where the line La is drawn). Accordingly, the nail shape detection unit 812*b* detects the curved shape of the nail T in the width direction.

If the line of the line image Lb has a certain level of width (that is, if the line La is relatively thick), the nail shape detection unit 812*b* extracts the center position of the line of the line image Lb in the width direction to detect the curved shape of the nail T using the center position.

In the above description, the line La, which is a certain figure for nail shape detection according to one embodiment of the present invention, is one straight line; however, the line La is not limited to this.

For example, one side along the width direction of the nail T may be a straight line and other parts may have an arbitrary shape such as a curve. In this case the curved shape of the nail T can be detected using the side with the straight line.

Furthermore, one side may not be a straight line but a predetermined shape such as one curve or polygonal line. Also in this case, the curved shape of the nail T can be detected using the side with the predetermined shape.

The method for detecting the nail height of the nail T or the curved shape of the nail by the nail shape detection unit 812*b* is not limited to the method described herein as long as it is based on the line image Lb, In the present embodiment, nail shape detection unit 812*b* classifies the curved shape of the nail T into one of predetermined several curve patterns based on the value of the curvature of the curved shape of the nail T detected based on the shape of the line image Lb, for example.

Information on the classified curve pattern is stored in the nail information storage area 822 as a part of nail information.

If the several curve patterns have three curve patterns, a curve pattern 1 corresponding to the smallest range of the curvature of the curved shape, a curve pattern 3 corresponding to the largest range of the curvature of the curved shape, and a curve pattern 2 corresponding to the range in which the curvature of the curved shape is between the curve pattern 1 and the curve pattern 3 are set. Then, the curved shape of the nail T is classified into one of the three curve patterns according to the curvature of the curved shape.

Note that, the method for classifying the curved shape of the nail T by the nail shape detection unit 812*b* is not limited to the method described above.

For example, the length Ly from the end in the y-axis direction (height direction) at the position apart from the one end of the nail T in the width direction by the certain length Lx in the x-axis direction (width direction of the nail T) may be detected in the curved shape of the nail T detected based on the shape of the line image Lb to detect a value of Ly/Lx as an end inclined angle, and then to classify the curved shape of the nail T based on the value of the end inclined angle.

For example, if the curve indicating the curved shape of the nail T detected based on the shape of the line image Lb is approximated to a quadratic function, a quadratic function approximated to the curve indicating the curved shape of the nail T is obtained by a least square approach. Then, a level of the curve of the nail T may be classified based on a coefficient of the quadratic function. To obtain an approximation of the curved shape of the nail T and the quadratic function by the least square approach can prevent an influence by a detection error to improve robustness of a detection result.

The drawing data generation unit 813 generates data for drawing a design on the nail T of the print finger U1 by the drawing unit 40 based on the nail information detected by the nail information detection unit 812.

Specifically, the drawing data generation unit 813 reduces or enlarges the image data of the selected design image (fitting treatment) based on the nail information such as the shape of the nail T detected by the nail information detection unit 812 to generate drawing data for drawing the design image on the nail T.

The drawing data generation unit 813 according to the present embodiment includes a drawing data correction unit 813*a* for correcting drawing data.

The drawing data correction unit 813*a* corrects drawing data for drawing a design on the nail T based on a result of the detection by the nail shape detection unit 812*b*.

As described above, in the present embodiment, the curved shape of the nail T is classified into a certain curve pattern of the predetermined several curve patterns (for example, three types of the curve pattern 1 to the curve pattern 3) by the nail shape detection unit 812*b*.

The memory 82 stores correction values corresponding to each curve pattern for applying curve correction on the drawing data. The drawing data correction unit 813*a* corrects the drawing data (curve correction) according to the correction values stored in the memory 82 corresponding to the certain curve pattern into which the curved shape of the nail T is classified.

The display control unit 814 controls the display 26 to display various pages on the display 26.

In the present embodiment, the display control unit 814 displays a page for selecting a design image, a thumbnail image for checking the design, the finger image generated by imaging the print finger U1, a nail image (image of the nail T) included in the finger image, and various instruction pages on the display 26, for example.

The drawing control unit 815 outputs the drawing data of the design image generated by appropriately applying curve correction by the drawing data generation unit 813 to the drawing unit 40. The drawing control unit 815 also controls the operation of the solenoid 742 that moves the X-direction moving motor 46 and the Y-direction moving motor 48, which are the carriage drivers 49 of the drawing unit 40, the ink discharger 411 of the drawing head 41, and the drawing tools 71 upward and downward as if a design is drawn on the nail T according to the drawing data.

In particular, in the present embodiment, the drawing control unit 815 obtains the width direction (X-direction in FIG. 1) of the nail T based on the area (nail area) formed by the outline of the nail T detected by the nail information detection unit 812, and detects the location with the maximum length on the nail area in the width direction. The drawing control unit 815 also causes the drawing tools 71 containing ink for drawing a line to draw the line La for nail shape detection (see FIG. 4) on that location of the nail T or its vicinity.

For highly precise detection by the nail shape detection unit 812*b*, it is preferable that the line La be relatively thin. Therefore, the drawing control unit 815 controls the operation of the drawing unit 40 so that the drawing tools 71 draw as thin line as possible.

Next, an operation of the drawing device 1 and a method for detecting a shape of a nail using the drawing device 1 according to the present embodiment will be described.

The curved shape of a nail is detected by the drawing device 1 when a user registers his/her own nail information in the device after he/she has purchased the drawing device 1 or when a new user registers his/her own nail information in the device.

The nail curvature may be detected only once when the user uses the drawing device 1 for the first time, or may be detected every time when a certain period has passed.

When the curved shape of the nail is detected again for the same nail T of the user once registered, the nail information stored in the memory 82 or the like may be replaced by the new detection result.

Figure 7:
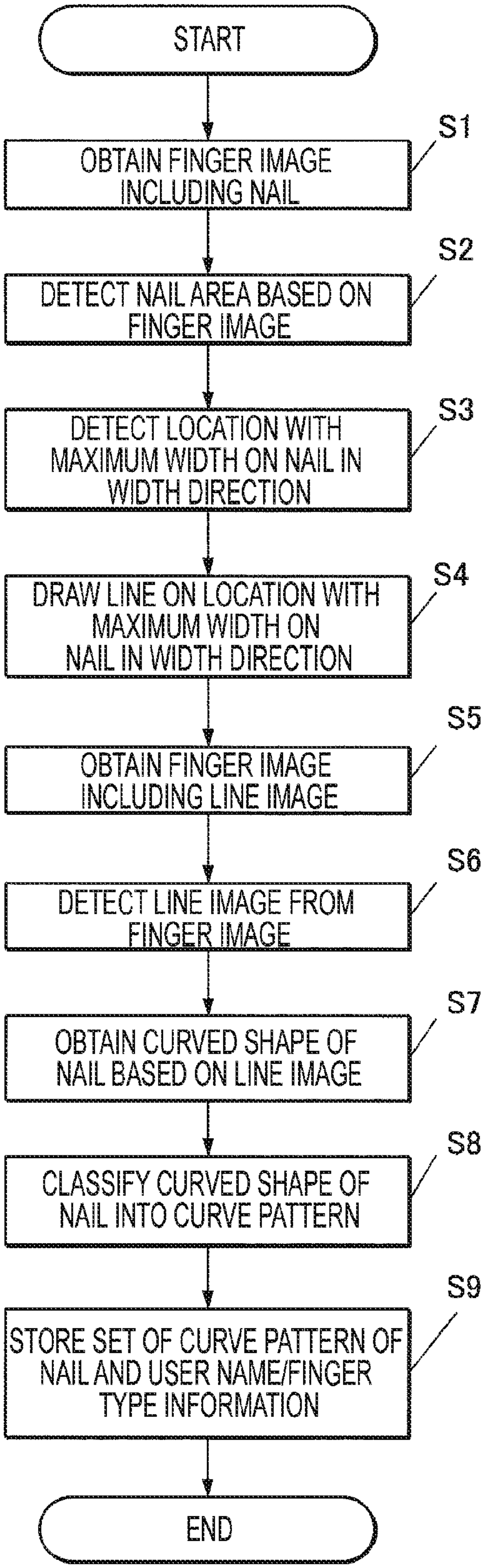
FIG. 7 is a flow chart showing a nail shape detection process according to one embodiment of the present invention.

FIG. 7 is a flow chart showing a process of a method for detecting a shape of a nail according to the present embodiment.

As shown in FIG. 7, in order to detect a curved shape of a nail using the drawing device 1, the user firstly turns on a power switch to start the controller 80.

Next, the user inserts the print finger U1 into the finger receiving unit 31 and inserts non-print fingers U2 into the finger escaping unit 32. After the print finger U1 is fixed, the user operates a switch to start detection operation.

When an instruction is input from the switch, the imaging control unit 811 controls the imaging section 50 to cause the camera 51 to image the print finger U1 while causing the lights 52 to illuminate the print finger U1. Accordingly, the imaging control unit 811 acquires a finger image of the print finger U1 inserted into the finger receiving unit 31 (step S1).

Next, the nail area detection unit 812*a* detects (calculates) an outline (nail area) of the nail T based on the finger image (step S2).

The drawing control unit 815 detects the location with the maximum width on the nail T in the width direction (X-direction) based on the detected nail area (step S3).

Then, the drawing unit 40 draws the straight line La for nail shape detection (see FIG. 4) on that location or its vicinity along the width direction of the nail T (step S4).

Specifically, the drawing control unit 815 starts the solenoid 742 of the drawing tools 71 containing ink for drawing the line so that the drawing tools 71 are ready to draw. The carriage driver 49 is then operated, and the drawing tools 71 are moved appropriately in the X- and Y-directions while the drawing tools 71 are held almost vertically against the mounting surface 116*c* so that the drawing tools 71 draws the straight line La along the width direction of the nail T.

Here, the drawing tools 71 are pushed onto the surface of the nail T by their own weight and draw the straight line La in the width direction of the nail T while moving upward and downward in accordance with the surface shape of the nail T.

After the line La is drawn on the nail T, the imaging control unit 811 again controls the imaging section 50 to cause the camera 51 to image the print finger U1 while causing the lights 52 to illuminate the print finger U1.

Accordingly, the imaging control unit 811 acquires the finger image including the line image Lb corresponding to the line La drawn on the nail T (step S5).

Once the finger image is acquired, the nail shape detection unit 812*b* detects the line image Lb from the finger image based on difference of the colors from the nail T (step S6).

Then, the nail shape detection unit 812*b* detects the curved shape of the nail T with a triangulation principle based on the shape of the line image Lb and a value of the inclined angle of the camera 51 (step S7).

The nail shape detection unit 812*b* then determines which of the predetermined several curve patterns the curvature of the detected curved shape of the nail T is the most similar to. Then, the nail shape detection unit 812*b* classifies the curved shape of the nail T into the curve pattern to which the curvature of the curved shape is the most similar (step S8).

After classification of the curve pattern about the degree of the curve of the curved shape of the nail T, the control unit 81 makes a set of the information on the curve pattern of the nail T and the finger type information indicating the user name and which finger (thumb to pinky finger) the nail T belongs to and causes the nail information storage area 822 of the memory 82 to store the set as the nail information (step S9).

Note that, in addition to the information on the classified curve pattern, information that can identify the type of the user and the finger and information on the outline of the nail detected by the nail area detection unit 812*a* are also stored in the nail information storage area 822.

When there is a finger of which nail information needs to be stored, the process described above is repeated about a finger of which information has not been stored.

Nail information of all of ten of left and right hand fingers may be stored. Or nail information on five hand fingers of one of right and left hands may be stored and the same nail information may be applied to the fingers of the other hand of the user.

After the process of detecting the curved shape of the nail, the user takes out the print finger U1 from the finger receiving unit 31. Then, the line La drawn on the nail T is removed by a solvent (such as polish remover).

If the user wishes to print a design on the nail T by the drawing device 1 after this, the user turns on the power switch to start the controller 80, inserts the print finger U1 into the finger receiving unit 31 and inserts the non-print fingers U2 into the finger escaping unit 32, and fixes the print finger U1. Then, the user operates a print switch.

When an instruction is input from the print switch, before the print operation is started, the imaging control unit 811 firstly controls the imaging section 50 to cause the camera 51 to image the print finger U1 while causing the lights 52 to illuminate the print finger U1 to acquire a finger image of the print finger U1 inserted into the finger receiving unit 31.

Next, the nail area detection unit 812*a* detects (calculates) the outline (nail area) of the nail T and the position of the nail T based on the finger image to obtain nail information.

The display control unit 814 displays a design select page on the display 26.

The user operates the controller 25 to select a desired design image from several design images displayed on the design select page.

Accordingly, a selection instruction signal is output from the controller 25 to select the design image to be printed on the nail T.

When the nail information is detected by the nail information detection unit 812, the drawing data generation unit 813 processes the image data of the design image based on the nail information so that the design image fits the nail area to generate drawing data.

Here, the drawing data correction unit 813*a* reads out the curve pattern and the correction value corresponding to the nail T from the memory 82, and appropriately applies curve correction to the drawing data according to the curve pattern of the nail T.

The curve pattern and the correction value of the nail T may be automatically read out by a matching of the outline of the nail T detected by the nail information detection unit 812 and the outline information of the nail stored in the nail information storage area 822.

The user may operate the controller 25 to input the user name and the type of the finger on which a design is to be drawn before the drawing is started, and the drawing data correction unit 813*a* may read out the curve pattern and the correction value corresponding to the nail T from the information in the memory 82 based on this input information.

After the drawing data to which curve correction has been applied is generated, the drawing control unit 815 outputs the drawing data to the drawing unit 40. Then, the drawing unit 40 draws the design image on the nail T according to the drawing data.

Specifically, the drawing control unit 815 operates the carriage driver 49 based on the drawing data to appropriately move the drawing head in the X- and Y-directions and operates the ink discharger 411 to discharge ink of each color from the drawing head 41 to draw a design on the nail T.

When a design is drawn by the drawing tools 71, the drawing control unit 815 drives the solenoid 742 to make the drawing tools 71 ready to draw. Then, the carriage driver 49 is operated based on the drawing data, and the drawing tools 71 are appropriately moved in the X- and Y-directions to draw a design on the nail T.

Here, the drawing tools 71 are pushed onto the surface of the nail T by their own weight and move upward and downward in accordance with the surface shape of the nail T to draw a design.

For example, when one design image has a part to be drawn by the drawing head 41 and a part to be drawn by the drawing tools 71 (e.g., the background is drawn by the drawing tools 71 and the detailed design is drawn by the drawing head 41), the drawing control unit 815 appropriately operates the solenoid 742 of the drawing head 41 and the ink discharger 411 of the drawing tools 71 to draw a design using both of the drawing head 41 and the drawing tools 71.

After the drawing is completed, the drawing control unit 815 moves the carriage 42 so that the drawing head 41 is located above the head cap unit 43 and the drawing tools 71 is located above the drawing tool caps 62. Then, the discharge surface of the drawing head 41 is covered by the head cap unit 43 and the drawing tool caps 62 are fixed to the drawing tools 71 to prevent the drawing head 41 and the drawing tools 71 from being dried.

As described above, according to the present embodiment, the drawing tools 71 provided to the drawing device 1 draws the straight line La along the width direction of the nail area for drawing the design image, and the nail shape detection unit 812*b* detects the curved shape of the nail T in the width direction based on the shape of the line image Lb acquired by imaging the line La from the obliquely upward direction.

As described, according to the present embodiment, the line image Lb, which is acquired by imaging the line La drawn directly on the nail T by the drawing tools 71, is used for detection of the curved shape of the nail. That is, it is not necessary to add a special unit that has not been provided to a drawing device such as a line laser light source for irradiating the nail T with line laser light for detecting the curved shape of a nail, and it is possible to detect the curved shape of a nail with the components that have been provided to a drawing device.

Furthermore, when line laser light is used for detection of the curved shape of a nail, the laser light irregularly reflects or diffuses on the surface of the nail depending on the surface condition of the nail. Therefore, the line formed on the surface of the nail by the line laser light may blur and it is sometimes not possible to precisely measure the curved shape of the nail. On the other hand, according to the present embodiment, since the line La is directly drawn on the nail T, there is no influence of the surface condition of the nail. Therefore, it is possible to precisely detect the curved shape of a nail with any surface conditions.

The nail shape detection unit 812*b* according to the present embodiment detects the curved shape of the nail T with a triangulation principle. Accordingly, it is possible to simply and precisely detect the curved shape of the nail T.

According to the present embodiment, the drawing data correction unit 813*a* corrects drawing data for drawing a design on the nail T based on the result of detection by the nail shape detection unit 812*b*. Therefore, it is possible to appropriately apply curve correction on the drawing data according to the curvature of the nail T, and it is possible to draw a beautiful design image without skews on the nail T.

According to the present embodiment, the nail shape detection unit 812*b* classifies the curved shape of the nail T detected based on the shape of the line image Lb into any one of predetermined several curve patterns. The drawing data correction unit 813*a* corrects the drawing data in accordance with a certain correction value determined for each curve pattern according to the classification by the nail shape detection unit 812*b*.

The curved shape of the nail T can be classified into three to five patterns for example, and it is possible to generate drawing data appropriate for the curved shape of the nail T by making a correction according to each curve pattern. With a correction value determined for each curve pattern, it is possible to simply and quickly correct the drawing data and to speed up the entire drawing process on the nail T without complicated operation.

Furthermore, according to the present embodiment, nail information on the curved shape of the nail of each finger type of the user is obtained and stored (registered) in the memory 82 as an initial process before drawing by the drawing device 1.

Therefore, once stored, it is possible to draw a design with the stored nail information and it is not necessary to detect the nail information such as the curved shape of the nail T every time the user draws a design by the drawing device 1. Accordingly, it is possible to simply and quickly enjoy nail print suitable for his/her nail T.

Embodiments to which the present invention can be applied are not limited to the embodiment described above and modifications are possible insofar as they do not depart from the spirit of the present invention.

In the embodiment described above, the drawing tools 71 draws the line La on the nail T while the drawing tools 71 are held almost vertically against the mounting surface 116*c*, and the light axis 51*a* of the camera 51 is provided obliquely against the mounting surface 116*c*. However, the relation between the direction of the drawing tools 71 and the direction of the light axis of the camera 51 is not limited to this. That is, other structures are possible as long as the direction of the drawing tools 71 is set to the direction with a first angle against the extending direction of the mounting surface 116*c* on the virtual vertical surface described above and the direction of the light axis of the camera 51 against the nail T is set to the direction with a second angle different from the first angle against the extending direction of the mounting surface 116*c* on the virtual vertical surface described above on the virtual vertical surface along the insertion direction of the print finger U1 into the finger receiving unit 31 that is vertical to the mounting surface 116*c* of the finger mounting unit 116*a* and orthogonal to the width direction of the nail T. In this case, the difference between the first angle and the second angle is the inclined angle.

According to the embodiment described above, the drawing control unit 815 draws only single line La at the location with the maximum width on the nail T in the width direction or its vicinity in the nail area, and the nail shape detection unit 812*b* detects the curved shape of the nail based on the shape of the line image Lb acquired by imaging the line La. However, a method for detecting the curved shape of the nail by the nail shape detection unit 812*b* is not limited to this.

Several lines La may be drawn at the different locations in the length direction of the nail T along the width direction of the nail T, and several line images Lb may be acquired by imaging the lines La by the imaging section 50. Then, the curved shape of the nail may be detected based on each shape of the several line images Lb.

When the number of the line images Lb to be detected is increased as described above, it is possible to obtain more detailed three-dimensional shape of the nail T. Then, it is possible to draw a design with high precision on the nail T by correcting the drawing data based on the three-dimensional shape of the nail T.

According to the present embodiment, imaging for detecting the outline of the nail T and imaging for acquiring the line image Lb are done by one camera 51. However, imaging may be done by more than one camera. For example, the camera 51 for acquiring the line image Lb may be provided to the back side of the device and another camera for acquiring an image for detecting the outline of the nail T may be provided just above the nail T.

According to the present embodiment, the camera 51 is provided to the back side of the device. However, the camera 51 for acquiring the line image Lb may be provided to another location as long as the light axis 51*a* of the camera 51 (lens of the camera 51 not illustrated) is provided at the location shifted to the extending direction of the finger against the line vertical to the surface of the nail T. For example, the camera 51 may be provided to the near side of the device.

According to the present embodiment, the line La for nail shape detection is drawn with the ink with colors easily distinct from the color of the nail T or the skin such as blue and green. However, the color of the ink for drawing the line La is not limited to this.

For example, the line La may be drawn with ink used for the foundation of the nail design drawn on the nail T (for example, white).

In this case, when the foundation is formed on the entire nail T, the line La may be drawn with the ink for the foundation before the foundation is formed on the nail T, and the foundation may be subsequently formed without removing the line La after detecting the curved shape of the nail. In this case, it is possible to omit the process of removing the line La drawn on the nail T. If an area on which the line La is to be drawn has a specific drawing area on which a design is to be drawn with ink of a specific color, the specific drawing area may be formed after the line La is drawn with the ink of the specific color and the curved shape of the nail is detected. Also in this case, it is possible to omit the process of removing the line La drawn on the nail T with the ink of the specific color.

The line La may be drawn with the color farthest from the color of the nail T or the skin among the colors used for drawing a nail design on the nail T.

In this case, it is not necessary to prepare the drawing tools 71 only for drawing the line La, and it is possible to omit the process of exchanging the drawing tools 71 before drawing a design.

Furthermore, the ink for drawing the line La for nail shape detection may be ink that becomes luminous and visible with irradiation with specific light such as ultraviolet-emitting transparent paint. Such paint is made of oil-based luminous ink for example.

In this case, a light source that can emit specific light with certain wavelength band that can let the paint become luminous (ultraviolet range) and with certain strength necessary for letting the paint become luminous (for example, black light for emitting ultraviolet light) may be provided inside the device, and the surface of the nail T is irradiated with specific light by the light source and the line La is imaged while the line La is luminous when the line image Lb is acquired by imaging the line La.

In this case, since the line La does not become luminous and visible in usual usage (that is, when the light from the certain light source is not emitted), it is not necessary to remove the line La before drawing a nail design on the nail T. That is, it is not necessary to remove the line La after detecting the nail curvature and a nail design can be subsequently drawn thereon. Accordingly, it is possible to omit the process of removing the line La before drawing a nail design on the nail T.

In the present embodiment, the drawing device 1 has been described as a hybrid nail print device including the ink-jet drawing head 41 and the drawing tools 71 as drawing tools. However, the drawing device is not limited to this, and the structure of the present invention may be applied to a plotter nail print device including only the drawing tools 71 and a nail print device including only an ink-jet drawing head.

If the drawing device is a nail print device including only an ink-jet drawing head, the line La for nail shape detection is drawn by the ink-jet drawing head.

According to the present embodiment, the nail T is classified into several curve patterns according to the degree of curve of the curved shape of the nail T and curve correction is applied with correction values determined for each curve pattern. However, classification of the nail T into the curve patterns is not always essential in the present invention.

For example, the curved shape of the nail T may be detected in more detail and curve correction may be applied with a certain correction value obtained according to the curved shape.

In this case, more precise correction is possible so that drawing with much higher precision is possible.

Some embodiments according to the present invention have been described above. However, the scope of the present invention is not limited to the embodiments described above and also covers the inventions described in the claims and their equivalents.

What is claimed is:

1. A drawing device comprising:

a mounting unit having a mounting surface on which an object is placed, the object is a finger or a toe having a nail;

a drawing unit configured to draw from a first direction at least one specific line by a drawing material on the nail placed on the mounting surface; and a nail shape detection unit configured to acquire from a second direction different from the first direction a specific picture by imaging the specific line and to detect a curved shape of the nail in a width direction of the nail based on a shape of the specific line along the width direction in the specific picture.

2. The drawing device according to claim 1, wherein at least a portion of the specific line is formed on a plane extending in the first direction, and the nail shape detection unit calculates a finger shape curve indicating a change of a position of a direction orthogonal to a plane direction of the mounting surface along the width direction at a location on the nail where the specific line is drawn as the curved shape of the nail in the width direction based on the shape of the specific line along the width direction in the specific picture and a difference between the first direction and the second direction.

3. The drawing device according to claim 1 further comprising a drawing control unit configured to control the drawing unit, wherein the drawing control unit causes the drawing unit to draw the specific line on the nail in a shape including a straight section along the width direction from the first direction.

4. The drawing device according to claim 1 further comprising:

a drawing control unit configured to control the drawing unit; and a nail area detection unit configured to detect a nail area formed by an outline of the nail from an image obtained by imaging the nail, wherein the drawing control unit obtains the width direction and detects a specific location with a maximum length on the nail in the width direction based on the nail area, and draws the specific line at the specific location or its vicinity.

5. The drawing device according to claim 4 further comprising a nail information memory configured to store information on the nail area detected by the nail area detection unit and the curved shape of the nail detected by the nail shape detection unit as nail information.

6. The drawing device according to claim 5, wherein the nail shape detection unit classifies the curved shape of the nail in the width direction into specific one of predetermined several curve patterns with different degrees of curve, and the nail information memory further stores information of the specific curve pattern.

7. The drawing device according to claim 5 further comprising a drawing data correction unit configured to correct drawing data correspond to a selected design image based on the nail information stored in the nail information memory.

8. The drawing device according to claim 1 further comprising a drawing control unit configured to control the drawing unit, wherein the drawing control unit further causes the drawing unit to draw an image on the nail based on a design image selected by a user.

9. The drawing device according to claim 1 further comprising a drawing control unit configured to control the drawing unit, wherein the drawing unit includes at least one of a drawing head for drawing the design on the nail by discharging a first drawing material and a drawing tool for drawing the design by applying a second drawing material on the nail in contact with the nail, and wherein the drawing control unit causes one of the drawing head and the drawing tool to draw the specific line on the nail.

10. A drawing device comprising:

a drawing unit configured to draw a design on a nail of an object which is a finger or a toe; and a nail shape detection unit configured to acquire a specific picture by imaging at least one specific line drawn on the nail by the drawing unit and to detect a curved shape of the nail in a width direction of the nail based on a shape of the specific line along the width direction in the specific picture.

11. The drawing device according to claim 10 further comprising a mounting unit having a mounting surface on which the object is placed, wherein the drawing unit draws the specific line from a first direction, and wherein the nail shape detection unit acquires the specific picture by imaging the specific line from a second direction different from the first direction, and detects the curved shape of the nail in the width direction based on the shape of the specific line along the width direction in the specific picture and a difference between the first direction and the second direction.

12. A method for detecting a shape of a nail in a drawing device, wherein the drawing device has a mounting unit having a mounting surface on which an object is placed, the object is a finger or a toe having a nail, the method for detecting the shape of the nail comprising the steps of:

causing a drawing unit configured to draw at least one specific line by a drawing material on the nail placed on the mounting surface from a first direction;

acquiring a specific picture by imaging the specific figure from a second direction different from the first direction; and detecting a curved shape of the nail in the width direction based on a shape of the specific line along the width direction in the specific picture.

13. The method for detecting the shape of the nail according to claim 12, wherein the method for detecting the shape of the nail further comprising the step of calculating a finger shape curve indicating a change of a position of a direction orthogonal to a plane direction of the mounting surface along the width direction at a location on the nail where the specific line is drawn as the curved shape of the nail in the width direction based on the shape of the specific line along the width direction in the specific picture and a difference between the first direction and the second direction.

14. The method for detecting the shape of the nail according to claim 12, wherein the step of causing the drawing unit to draw the specific line on the nail further comprising the step of causing the drawing unit to draw the specific line on the nail in a shape with a straight section along the width direction from the first direction.

15. The method for detecting the shape of the nail according to claim 12 further comprising the steps of:

detecting a nail area formed by an outline of the nail from an image obtained by imaging the nail; and obtaining the width direction and detecting a specific location with a maximum length on the nail in the width direction based on the nail area, wherein the step of causing the drawing unit to draw the specific line on the nail further comprising the step of causing the drawing unit to draw the specific line at the specific location on the nail or its vicinity.

16. The method for detecting the shape of the nail according to claim 12 further comprising the steps of:

classifying the curved shape of the nail in the width direction into specific one of predetermined several curve patterns with different degrees of curve;

storing information of the nail area and the specific curve pattern in a nail information memory as nail information; and correcting drawing data correspond to a selected design image based on the nail information stored in the nail information memory.

* * * * *